United States Patent [19]
Brill

[11] 3,754,462
[45] Aug. 28, 1973

[54] INFUSOR DRIVE MEANS

[75] Inventor: Frank D. Brill, Norridge, Ill.

[73] Assignee: The Seeburg Corporaton of Delaware, Chicago, Ill.

[22] Filed: Sept. 28, 1971

[21] Appl. No.: 184,499

[52] U.S. Cl.................. 99/287, 99/289, 99/297, 99/302 P
[51] Int. Cl.... A47j 31/18, A47j 42/46, A47g 19/14
[58] Field of Search.................. 99/287, 289, 292, 99/297, 302 P

[56] References Cited
UNITED STATES PATENTS

| 3,682,090 | 8/1972 | Meriggi | 99/289 |
| 3,413,907 | 12/1968 | Schwertfeger | 99/287 |
| 2,387,871 | 10/1945 | Baumann | 99/302 P |
| 2,667,114 | 1/1954 | Burgess | 99/287 |
| 2,827,845 | 3/1958 | Richeson | 99/287 X |

Primary Examiner—Wayne A. Morse, Jr.
Attorney—Ronald L. Engel, James M. Amend et al.

[57] ABSTRACT

An infusor apparatus for a coffee brewing machine has a cam driven piston means. The cam has appropriate dwells formed thereon to interrupt the travel of the piston means during the compression stroke approximately halfway along the stroke and again at the completion thereof, in order to relieve the pressure within the chamber during and after brewing so that infusible or brewed material will not be blown from the chamber when it is suddenly opened after brewing is completed.

1 Claim, 4 Drawing Figures

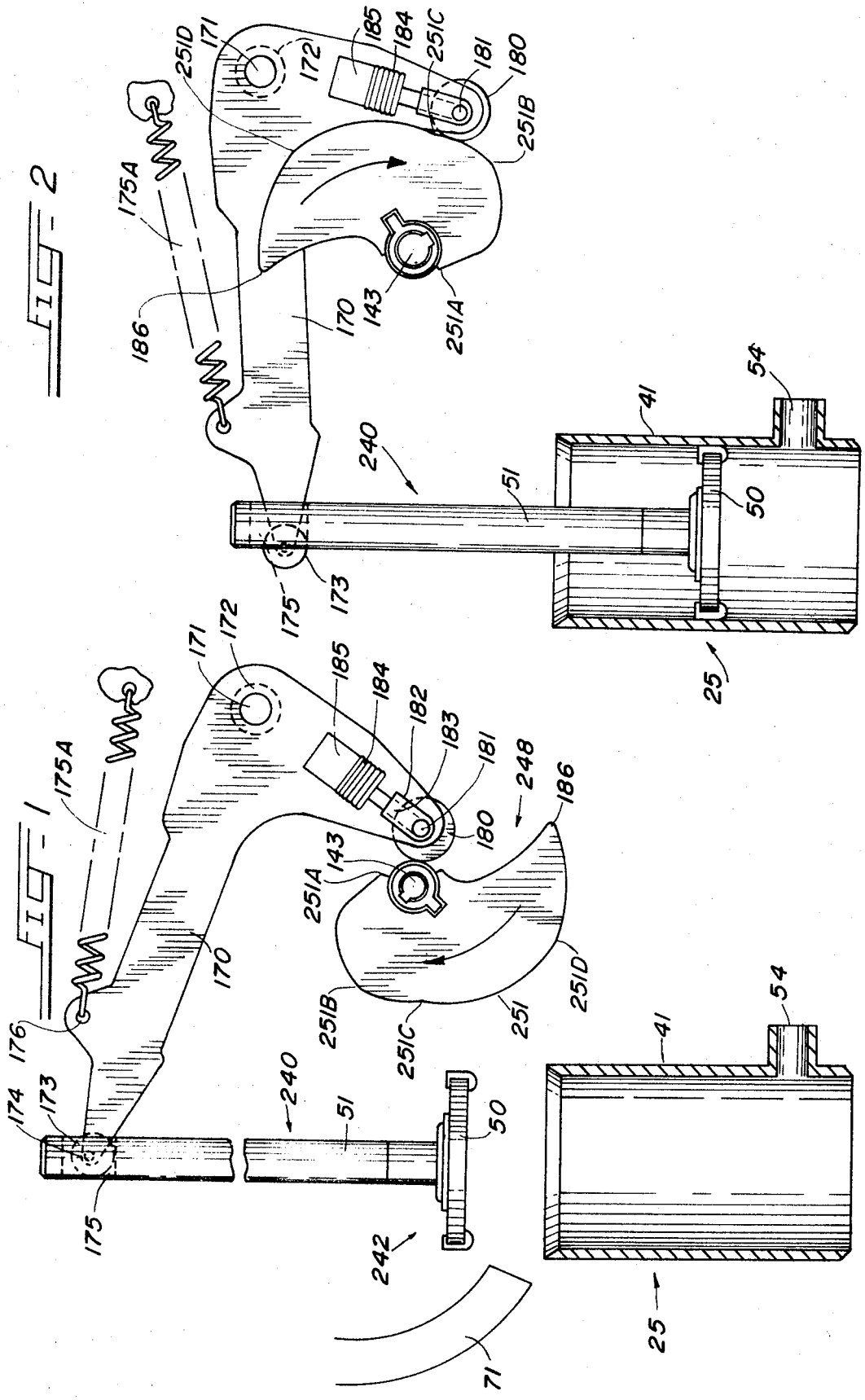

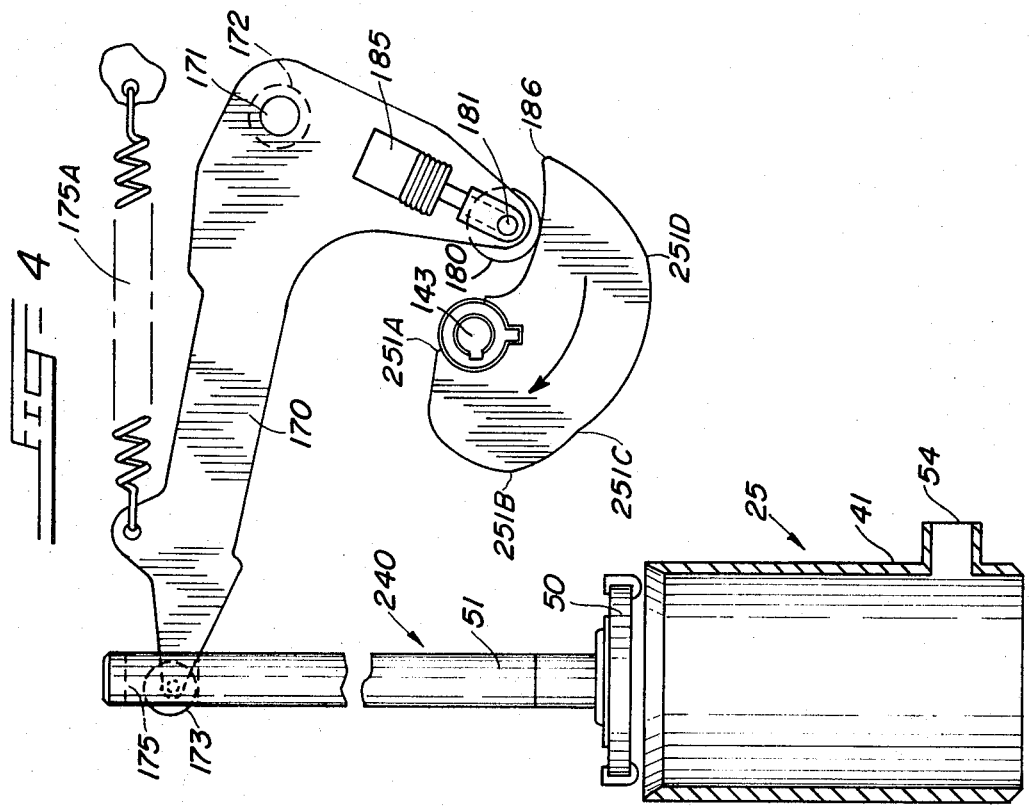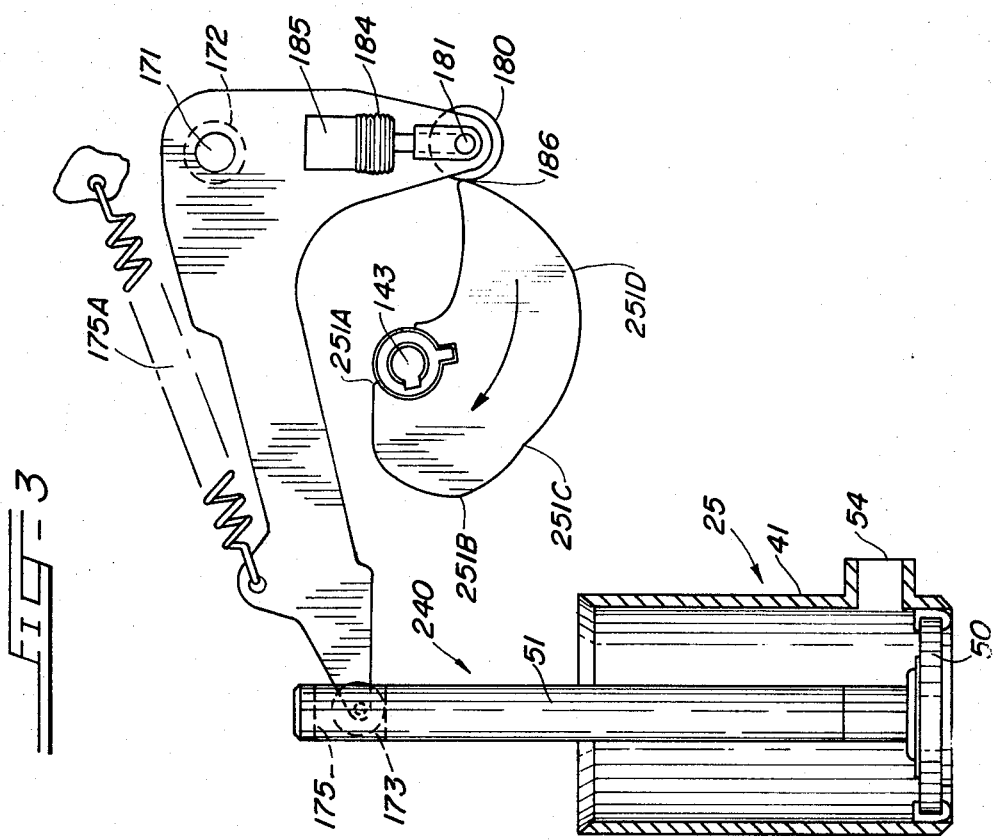

INFUSOR DRIVE MEANS

PATENT INCORPORATED BY REFERENCE

The subject invention comprises an improvement upon the Infusor Apparatus which is fully described in the patent issued to O.J. Schwertfeger et al. on Dec. 3, 1968, U.S. Pat. No. 3,413,907 (copy submitted herewith), the disclosure of which is incorporated herein by reference for the purpose of placing the instant invention in its proper context. The reference numerals utilized in U.S. Pat. No. 3,413,907 have been carried over to the instant application, where possible, for convenience and to promote clarity of reference, and additional reference numerals have been added in the instant specification to point out particularly the improved features comprising the subject invention.

BACKGROUND OF THE INVENTION

1. Field of the Invention

The subject invention relates to the infusor art, and more particularly this invention relates to an improvement in the control of the brewing cycle of a coffee brewer and vendor.

2. Description of the Prior Art

The most pertinent prior art reference is the Schwertfeger et al. patent which is incorporated by reference herein. That patent discloses an improved one cup coffee brewer and dispenser comprising a brewing chamber having a coffee outlet opening and filter means adapted to operate in conjunction therewith. In that device, which itself represented a significant advance in the infusor apparatus art, means were provided for: (1) placing a charge of ground coffee in the brewing chamber; (2) sealing the ground coffee therein; and (3) injecting a jet stream of hot water into the ground coffee so as to cause vigorous agitation thereof. Simultaneous with the influx of hot water, pressurizing means in the form of a piston were adapted to increase the pressure within the brewing chamber so that the ground coffee was rapidly and thoroughly infused with the heated water. The resulting brewed coffee was discharged from an outlet opening in the chamber through suitable filter means, said filter means also being adapted to dispose of the coffee grounds after brewing was completed.

Inherent in the device of the Schwertfeger et al. patent, and in other prior art infusor apparatus which require the pressurization of the brewing chamber, is the problem of fouling of the mechanisms contained therein by spent coffee grounds or other infusible material. In situations wherein the pressure in the brewing chamber was not fully released prior to the opening of the brewing chamber immediately following brewing completion, which frequently occurred, the resultant rush of compressed air from the chamber blew spent grounds about the interior of the apparatus before said grounds could be disposed of properly.

The foregoing problem was exacerbated when soft water was used in brewing. Soft water causes coffee grounds and the like to swell to a much greater extent than does hard water, thus inhibiting the passage of both compressed air and brewed coffee through these grounds to the outlet. In such instances the full charge of brewed coffee frequently was not expelled from the brewing chamber, nor was the pressure in the chamber fully relieved before the chamber was opened. The result was that brewed coffee and coffee grounds were blown about the infusor device upon the chamber's being opened.

And regardless of the type of water used in brewing, difficulty was also encountered in connection with prior art infusor devices when the brewing of larger cups of coffee than originally contemplated for the design of a given device was attempted. When timed for the brewing of smaller cups of coffee, an insufficient period was allowed for the complete brewing of the larger batch, and coffee of a weak and unmarketable quality was produced. The problems of insufficient time to completely expel all of the brewed or partially brewed mixture and compressed air from the chamber were increased in proportion to the increase in batch quantity.

As will be seen below, the foregoing problems have been substantially eliminated by the improvement in infusor drive means represented by the subject invention.

SUMMARY OF THE INVENTION

In order to overcome the above-described disadvantages which inhere in infusor brewing devices in which the brewing chamber is pressurized by pressurizing means in the form of a piston which steadily decreases the volume therewithin (as in the apparatus described in the Schwertfeger et al. patent and most other prior art devices), the subject invention is adapted to permit the periodic release of pressure within the brewing chamber during the brewing operation and the complete brewing of larger-than-normal batches. To this end the subject invention comprises a cam with appropriate dwells adapted to drive the piston means in such a manner so as to convert the uninterrupted piston compression stroke of the prior art devices into an intermittent stroke and to provide for the piston's remaining stationary at the completion of its compression stroke for a period of time before the brewing chamber is opened.

More specifically, the device disclosed in the Schwertfeger et al patent employed a cam which causes a steady travel of the piston throughout its compression stroke by means of a pivotable spring-biased lever. Immediately upon the completion of the compression stroke the bias on the lever caused the piston to be withdrawn from the brewing chamber. In contrast to this arrangement, the cam comprising the subject invention is provided with two dwells. The rotary motion of this improved cam is translated by the same lever linkage utilized in the Schwertfeger et al device into an intermittent piston compression stroke, having pauses at approximately the middle and end of the said stroke. The first dwell portion of the subject cam is designed to produce a pause of approximately 1.0 second at the halfway point, and insures that adequate time is allowed for complete brewing of the coffee, regardless of the batch size, and prevents the expulsion of underbrewed coffee from the brewing chamber. The second dwell causes a pause of approximately 2.0 seconds duration after completion of the compression stroke and before the brewing chamber is opened, thus insuring equalization of the pressure within the brewing chamber with that of the external chamber environment and obviating the problem of the apparatus being fouled by coffee grounds and/or non-dispensed brewed coffee being blown from the chamber by the sudden exit of compressed air when the chamber is opened. The improved cam comprising the subject invention thus substantially eliminates problems long associated with piston-type brewing devices, and is of particular advantage where soft-water and/or relatively large-sized cup brewing is attempted.

Accordingly, a primary object of the subject invention is to improve infusor brewing devices, and to prevent them from being fouled by the expulsion of coffee grounds or non-dispensed brewed coffee from the brewing chamber at the end of the brewing cycle.

It is another object of the subject invention to improve the quality of coffee or the like produced by infusor brewing devices.

It is a still further object of the subject invention to improve the operation of infusor brewing devices when soft water is used as a brewing media therein.

It is yet a further object of the subject invention to improve the operation of infusor brewing devices by permitting them to brew larger batches of infusible material than was originally intended, while maintaining the high quality of the resultant product.

DESCRIPTION OF THE DRAWING

FIG. 1 is a schematic view of an embodiment of an infusor drive means in accordance with the present invention, showing the first step of the brewing cycle.

FIG. 2 is a schematic view of the drive means shown in FIG. 1 at a later point in the brewing cycle, in which the piston is in a first rest position.

FIG. 3 is a schematic view of the drive means shown in FIG. 1 at the end of the brewing cycle, in which the piston is in a second rest position.

FIG. 4 is a schematic view of the drive means shown in FIG. 1 in its normally biased position following the end of the brewing cycle.

DESCRIPTION OF THE PREFERRED EMBODIMENT

As mentioned hereinbefore, the improved infusor drive means of the subject invention is adapted for incorporation into the Infusor Apparatus described in detail in the patent to Schwertfeger et al. U.S. Pat. No. 3,413,907, the disclosure of which is incorporated herein by reference. Except for the inventive improvement in the drive means described herein, the operation and construction of the infusor apparatus is precisely as described in the Schwertfeger et al. patent, and a description of the portions thereof not relevant to the subject improvement will not be repeated herein. FIG. 2 of the patent to Schwertfeger et al shows the prior art construction which the subject invention is designed to improve and replace, and a comparison of that FIGURE with the drawing in the present application will clearly indicate the context of the present invention. The reference numerals in FIG. 2 of the Schwertfeger et al reference have been carried over to the present drawing, where possible, to facilitate this comparison.

With reference to the present drawing, FIG. 1 shows the relevant portions of the brewer assembly 25 and the unitary drive assembly 31, which are described more fully in the Schwertfeger et al patent. Brewer assembly 25 comprises a generally cylindrical brewing chamber 41 which is open at the bottom and top. Chamber 41 is provided with a water ingress port 54 adjacent to its lower edge. Pressurizing means 240 adapted to increase the pressure within chamber 41, comprise piston means 242 and more specifically, piston 50 which is fixedly mounted on a piston shaft 51 in a conventional manner. Piston 50 is adapted to be driven reciprocably between the positions schematically shown in FIGS. 1-4, with part of its travel taking place within chamber 41. Chute spout 71 provides a means by which a brewing charge of infusible material such as coffee or the like may be introduced into brewing chamber 41.

Unitary drive assembly 31 is adapted to drive piston 50 in a manner hereinafter described and comprises cam means 248. A drive cam 250 (which differs from cam 144 in the Schwertfeger et al patent) is mounted on cam shaft 143 and comprises a novel piston drive profile 251 (designated at various points by reference characters 251A, 251B, 251C, 251D and 186, the significance of which will hereinafter appear) and a chamber drive profile (not shown, but identical to chamber drive profile 146 in the Schwertfeger et al patent). Drive assembly 31 further comprises a pair of L-shaped arms 170, which are pivoted about a pivot shaft 171 and are separated by a spacer 172 also mounted on shaft 171. A roller 173 is rotatable between the upper ends of L-shaped arms 170 about a pivot shaft 174, and is adapted to move in a slot 175 (shown in broken lines in FIG. 1) as piston shaft 51 slides downwardly. A spring 175A is stretched between a pin 176 which passes between brackets 177 on L-shaped arms 170 and a bracket attached to the frame of the Schwertfeger apparatus (not shown), thereby urging L-shaped arms 170 toward their normally biased positions shown in FIG. 4.

A spring-loaded roller-follower 180 is mounted between the lower end of L-shaped arms 170, and roller-follower 180 is adapted to contact and engage cam profile 251 on cam 250. Roller-follower 180 rotates about a pivot shaft 181, the ends of which are rotatably journaled in a pair of spring-pushing brackets 182. A slot 183 (shown in broken lines in FIG. 1) is provided in each lower end of L-shaped arms 170 in a manner such that the pivot shaft 181 is slideable between a lowered and raised position. A pair of springs 184 are respectively held in a pair of spring-retaining members 185 fixed to each lower end of L-shaped arms 170, and springs 184 urge brackets 182 downwardly. The purpose for spring loading roller-follower 180 will hereinafter appear.

As cam 250 rotates in a clockwise direction (as shown by the arrow in FIG. 1) cam profile 251 acts against roller-follower 180, thereby causing L-shaped arms 170 to initially pivot in a counterclockwise direction about shaft 171. This in turn causes piston 50 to be driven downwardly (e.g., from the position shown in FIG. 1 to that shown in FIG. 2) by roller 173 disposed in slot 175 of piston shaft 51, piston 50 being maintained in alignment by means of bearing guides (not shown) which control the downward sliding movement thereof.

In the actual operating sequence, as cam 250 rotates in a clockwise direction from its normally biased position shown in FIG. 4 to the position shown in FIG. 1, piston 50 is correspondingly raised from the position shown in the former FIGURE to that shown in the latter. When piston 50 is in the FIG. 1 position infusible material is introduced into chamber 41 through chute spout 71. Thereafter, as cam 250 continues to rotate, roller-follower 180 traverses cam shaft 143 and reaches the first rise of cam profile 251 indicated by the portion of cam profile 251 included between points designated by reference numerals 251A and 251B. By means of the above-described unitary drive means 31, this traversal results in the movement of piston 50 from the position shown in FIG. 1 to that shown in FIG. 2. After traversing this rise, roller-follower 180 encounters a first dwell portion on cam profile 251, which includes that portion of the profile located between points designated by reference characters 251B and 251C. As this dwell portion is traversed, piston 50 remains substantially motionless in a first rest position for approximately 1.0 seconds, at a point approximately halfway along its total distance of downward travel, or compression stroke. FIG. 2 indicates the position of piston 50 and relevant parts of the unitary drive assembly 31 during this portion of the cam rotation cycle.

After traversing first dwell portion 251B—251C, roller-follower 180 encounters a second rise on cam profile 251, which occupies the portion of said profile included between points designated by reference numerals 251C and 251D. During the traversal of this rise, piston 50 is driven from the position shown in FIG. 2 to that shown in FIG. 3, the latter being its lowest point of travel, and corresponding to the end of the compression stroke. The position of piston 50 shown in FIG. 3, its second rest position, is maintained for a period of approximately 2.0 seconds as roller-follower 180 traverses the second dwell portion of cam profile 251, which includes the portion of said profile between points designated by reference numerals 251D and 186.

As roller-follower 180 reaches the return portion of cam profile 251, beginning at the point indicated by reference character 186, spring 175A causes clockwise movement of L-shaped arms 170 and pulls piston shaft 51 and piston 50 upwardly, back to their normally biased positions shown in FIG. 4.

Roller-follower 180 is spring loaded, as previously described, so as to release any stress which develops within drive assembly 31 as cam 250 rotates. Thus as roller-follower 180 passes over the return portion of cam profile 251 it is pushed upwardly into slot 183 against the bias of spring 184.

As discussed hereinbefore, the novel improvement in drive assembly 31 described above greatly enhances the dependability and capability of the infusor apparatus in which it is designed to be incorporated. The first dwell portion on cam 250, designated on cam profile 251 by reference numerals 251B–251C, results in piston 50 maintaining a first rest position for approximately 1.0 second (FIG. 2) at a point halfway along its compression stroke. This provides an opportunity for more complete brewing of the infusible material introduced into chamber 41 through chute spout 71, and is particularly advantageous in connection with the brewing of large batches of coffee or the like. By permitting use of the same infusor apparatus for the brewing of various sized portions of the beverage to be dispensed, this novel feature provides a significant improvement over prior art devices.

Furthermore, the second dwell portion on cam 250, designated on cam profile 251 by reference numerals 251D–186 prevents any liquid or remnants of infusible material (e.g., coffee grounds or the like) remaining in chamber 41 after brewing is completed from being blown out of chamber 41 when piston 50 is withdrawn from the chamber (FIG. 4). The second dwell portion permits piston 50 to remain in a second rest position (FIG. 3) for about 2.0 seconds, during which time any pressure within chamber 41, built up during the compression stroke of piston 50, can be released. This is particularly important in connection with soft-water brewing, wherein normal pressure dissipation through the bottom of chamber 41 is impeded by the swelling of the infusible material within the chamber.

Thus, the subject invention provides a unique method for increasing the versatility and dependability of operation of an infusor apparatus such as that shown in the Schwertfeger et al. patent. Not only is the possibility of the fouling of such an apparatus during normal operation substantially eliminated, but the subject invention allows such an apparatus to be used in brewing large cups of coffee and the like and in operations where soft water is employed as a brewing media.

Obviously, many other modifications and variations of the present invention are possible. It is to be understood that the invention described in this application is not limited to the details of construction and arrangement of parts specifically described or illustrated. It should further be understood that various changes, modifications and alterations may be effected in the parts and elements in the described embodiment without departing from the spirit and scope of the present invention, as described in the appended claims.

I claim:

1. In an infusor apparatus for brewing coffee and the like comprising a brewing chamber in which infusible material and a liquid jet stream are combined and comprising reciprocable piston means to decrease the volume within the brewing chamber, an improvement in the drive means to activate said piston means comprising:

cam means having at least two dwell portions, wherein said first dwell portion causes the travel of said piston means to be interrupted intermediate the ends of its compression stroke for a sufficient time to permit the completion of the brewing of the infusible material; and wherein said second dwell portion causes the travel of the piston means to be interrupted at the end of its compression stroke and before the initiation of its exhaust stroke for a sufficient time to permit the pressurized liquid to be expelled from the the bottom of the chamber and to permit the pressure built-up within said brewing chamber to be dissipated through the bottom of the brewing chamber until the pressure within the chamber is equalized with the ambient pressure.

* * * * *